Feb. 9, 1954 E. E. HERMAN 2,668,908
PANORAMIC RECEIVER BANDPASS COMPENSATION SYSTEM
Filed Sept. 19, 1945 2 Sheets-Sheet 1
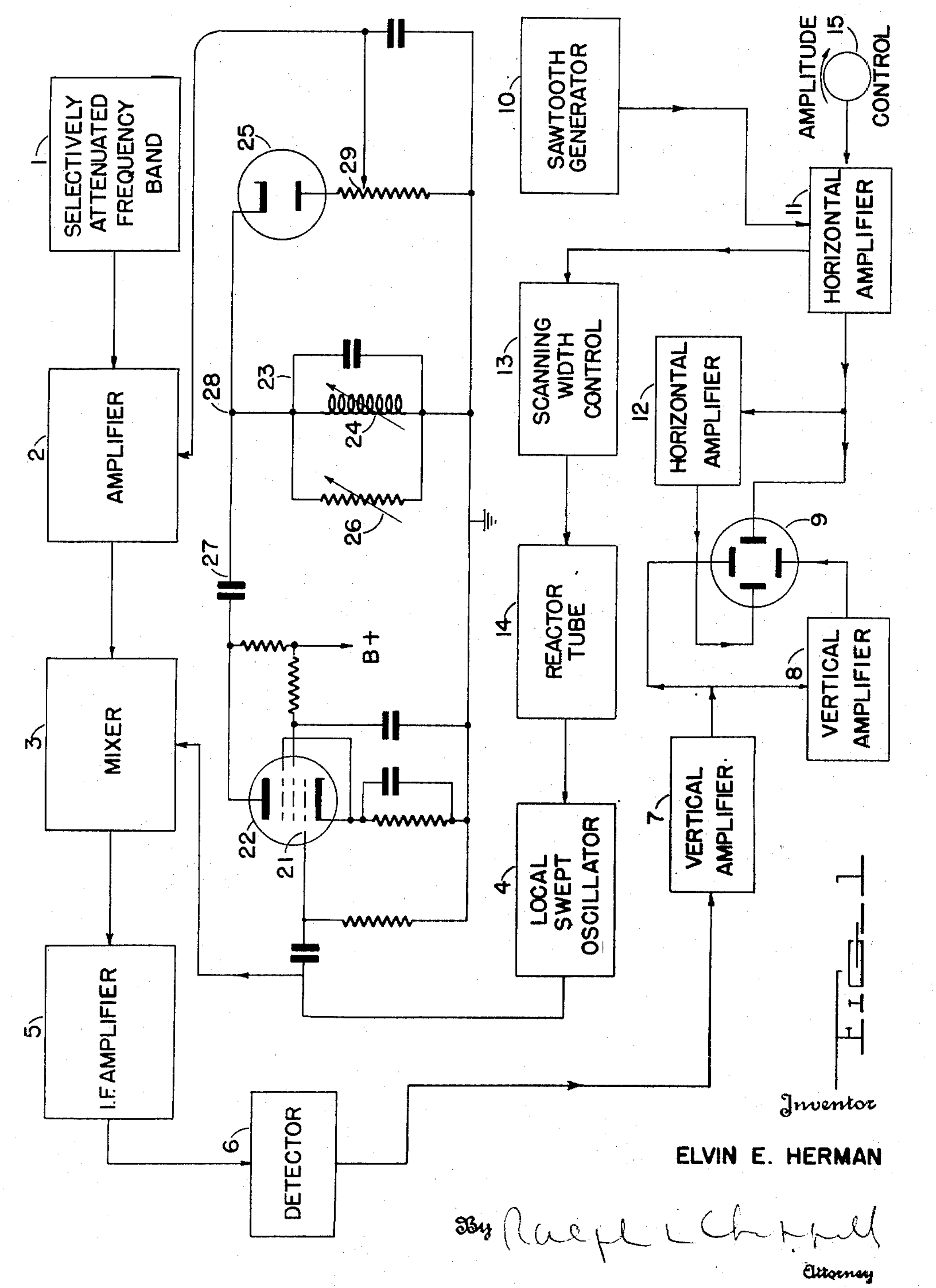
Inventor
ELVIN E. HERMAN
By Ralph L Chappell
Attorney

PANORAMIC RECEIVER BANDPASS COMPENSATION SYSTEM

Filed Sept. 19, 1945 2 Sheets-Sheet 2

Inventor
ELVIN E. HERMAN
By Ralph L. Chappell
Attorney

Patented Feb. 9, 1954 2,668,908

UNITED STATES PATENT OFFICE 2,668,908

PANORAMIC RECEIVER BANDPASS COMPENSATION SYSTEM

Elvin E. Herman, Washington, D. C.

Application September 19, 1945, Serial No. 617,405

19 Claims. (Cl. 250—20)

(Granted under Title 35, U. S. Code (1952), sec. 266)

This invention relates to means for bandpass compensation for frequency selective circuits in panoramic receivers or frequency scanning devices and is particularly directed to a means of obtaining the desired compensation by varying the gain of the device as the frequency is being scanned. It is accordingly an object of this invention to supply a bias voltage which can be used to vary the gain of a frequency scanning device in such a way as to compensate for frequency selectivity in circuits in or coupled to the device.

It is another object of the invention to provide a means of bandpass compensation that is readily adjustable to compensate for different conditions of circuit selectivity.

It is another object of the invention to supply a bias voltage, the waveform of which can be varied to compensate for different conditions of receiver selectivity, and the amplitude of which can be varied by suitable means.

A further object is to provide a means of bandpass compensation which can be readily adjusted for variations in center frequency.

Another object is to provide a means of bandpass compensation in which the amount of compensation varies automatically as the width of spectrum swept is changed.

Still a further object is to provide a means of bandpass compensation for a visual frequency scanning device which results in visual signals presented being more nearly proportional to signal strength at the receiver antenna than in prior art devices.

The invention will be further understood with reference to the exemplary embodiment shown in the drawing in which:

Fig. 1 shows partly in block and partly in circuit diagram a frequency scanning device incorporating the invention.

Figures 2, 3:
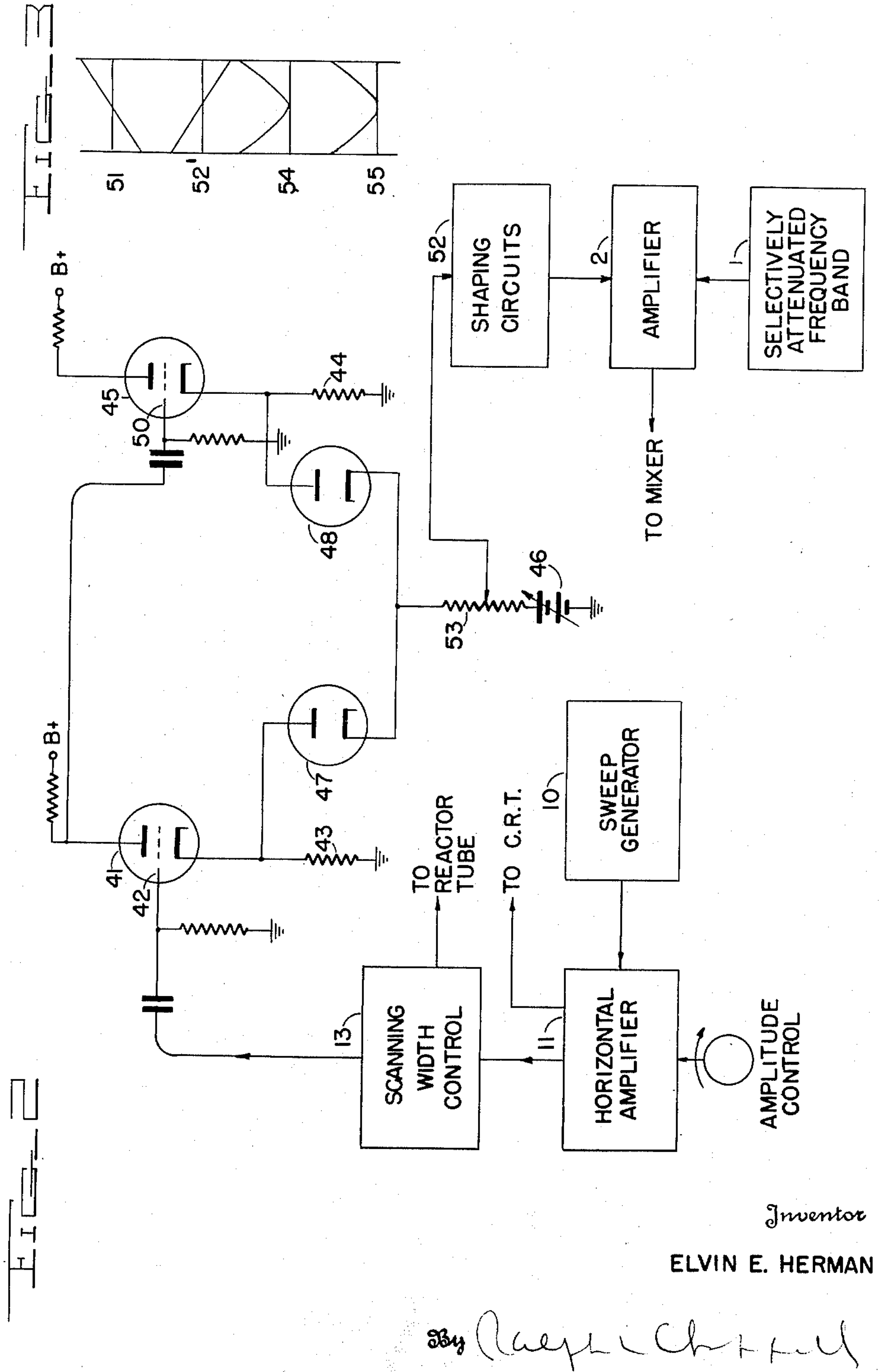
Fig. 2 shows partly in block and partly in circuit diagram another embodiment of the invention.
Fig. 3 shows wave forms developed by the circuit of Fig. 2.

The block diagram portion of Figure 1 represents a frequency scanning device with visual presentation and the circuit diagram portion represents a means for supplying a bias voltage to be used in varying the gain of the device to compensate for frequency selective circuits. The scope of the invention is not limited to a visual type of presentation, however.

In such a device, radio frequency signals are indicated on the screen of a cathode ray tube by vertical deflection "pips," and the horizontal displacement of the "pips" indicates the difference between the signal frequency and the center frequency, which in certain applications may correspond to the frequency dial setting of a companion receiver. In order that the panoramic device illustrated by Fig. 1, continuously present a selected spectrum surrounding the center frequency, it is necessary that the input frequency band be scanned as the cathode ray tube beam sweeps horizontally across the screen.

As the frequency band is swept, the gain of the amplifier is changed to compensate for the frequency selectivity of the previous selective circuits and/or of the amplifier. However, for most applications, the only compensation required is for previous selective circuits.

In Fig. 1, the selectively attenuated signal input 1 is fed through the amplifier 2 to the mixer 3, where it beats with the output of the local swept oscillator 4. The frequency of the oscillator 4 varies with time, and hence the I.-F. output of the mixer will be a series of signals, whose time of appearance depends on frequency. The mixer output is amplified in the I.-F. amplifier 5, and demodulated in detector 6. The signal output of the detector is fed through amplifiers 7 and 8 and applied to the vertical deflection plates of cathode ray tube 9.

A saw tooth sweep voltage is produced in the generator 10 and applied through amplifiers 11 and 12 to the horizontal plates of C.-R. tube 9.

This sweep voltage causes the beam of the cathode ray tube to move horizontally across the screen as the signals, whose time of appearance depends on frequency, are applied to the vertical deflection plates.

This is the case because the sweep voltage is also employed to vary the frequency of the local swept oscillator. Hence the time of appearance of signals of different frequencies is synchronized with the motion of the sweep across the screen. "Pips" will then appear along the time base in a position dependent on frequency.

To continuously vary the frequency of the local swept oscillator 4, the output of sawtooth generator 10 is applied through the amplifier 11 and scanning width control 13 to the reactor tube 14. The reactor tube is coupled across the antiresonant circuit of oscillator 4 and injects an effective varying inductance into the antiresonant circuit as the $g_m$ of the tube changes due to the application of the sawtooth voltage to its grid or cathode. The effective inductance injected into the tank circuit changes the frequency of the oscillator. Thus, as the sawtooth voltage increases proportionally to time, the $g_m$ of the reactor tube changes proportionally to time, injecting into the tank circuit of the oscillator a reactance proportional to time, which causes the frequency of the oscillator to vary proportionally to time.

The length of the time base of the C. R. tube and the frequency range of the swept oscillator can be varied together by changing the gain of amplifer 11 with amplitude control 15. The frequency range of the swept oscillator 4 can be varied independently of the time base of the C. R. T. by the scanning width control 13.

The output of the local swept oscillator 4 is used also to supply the bias voltage for the band pass compensation. This output is fed to grid 21 of amplifier 22, which in addition to its amplifying action isolates the local oscillator 4 from the tank circuit 23 and also may act as a limiter. Circuit 23 is tuned to the center frequency of the local oscillator by variable inductance 24.

The amplified output of oscillator 4, which varies from a point below center frequency to an equal point above center frequency, is selectively attenuated by the tank circuit 23. The diode 25 rectifies the selectively attenuated output of amplifier 22 and applies it as a negative biasing voltage to the grid of one or more of the tubes in amplifier 2. It is to be understood that this bias may be applied to the I.-F. amplifier or the mixer as well as to amplifier 2 or to any combination thereof.

The waveform of the bias voltage will follow a normal frequency selectivity curve whose shape depends on the Q of the tuned circuit. Hence, at a point below center frequency, where the amplitude of the input 1 is low, the negative bias applied to the amplifier from diode 25 will be low. At a point near center frequency where the amplitude of the input is high, the bias of amplifier 2 will be high. At a point above center frequency where the input amplitude is low the bias will be low. Hence the gain of amplifier 2 is varied in such a way as to compensate for the selectivity of the amplifier and of previous circuits.

Different conditions of circuit selectivity require variation of both the shape and the overall amplitude of the bias waveform.

The effective Q of the tuned circuit can be varied by adjusting potentiometer 26, thus changing the compensation bias wave shape. The potentiometer could be placed between condenser 27 and contact 28 instead of as shown. Potentiometer 29 is used to adjust the overall amplitude of the bias waveform.

When the local oscillator sweeps over a smaller frequency range, due to lower setting of control 13, less bandpass compensation is needed. Since the compensation waveform is derived from the local oscillator output, this correction takes place automatically. A smaller excursion of the oscillator frequency, for example, results in smaller overall amplitude change in the bias waveform.

It will be noted that in effect the voltage variation of the sweep generator 10 was shaped to produce the band pass compensation, since the sweep voltage varied the frequency of the local oscillator output from which the bias wave form was derived. For higher frequencies, it is best to shape the output of the sawtooth generator directly by some such circuit as is shown in Fig. 2 rather than to shape the output of the local oscillator 4. The portion of Fig. 2 shown in schematic is essentially a full wave rectifier.

Vacuum tube 41 is an amplifier with circuit values so chosen as to give a gain of unity. The circuit is also designed so that when zero signal appears at grid 42 of tube 41, the cathode to ground voltage across resistor 43 of tube 41 equals that across resistor 44 in the cathode circuit of tube 45.

The voltage from sweep generator 10 is fed through amplifier 11 and potentiometer 13 to grid 42 of tube 41.

Let the voltage across resistor 43 be E for "no signal" at grid 42. The voltage across resistor 44 is also E. If the voltage across bias source 46 is also set at E, then no appreciable currents flow in the two diodes 47 and 48 for the plate voltage of each diode equals its cathode voltage.

If now, the sweep voltage is introduced at grid 42 of tube 41, this grid will vary uniformly from a value below average bias to an equal value above average bias during each cycle as shown by waveform 51 of Fig. 3. The voltage at grid 50 of tube 45 will be as shown in waveform 52' since the gain of tube 41 is 1.

As the voltage at grid 42 changes from a value below average bias up to average bias, the voltage across cathode resistor 43 will vary from a value below E up to E. Tube 47 will not conduct since its plate is always below E and its cathode is E. Tube 47 then develops no voltage across resistor 53 in this interval.

During the first half cycle, however, the grid 50 of tube 45 varies from a value above average bias to average bias causing the voltage across cathode resistor 44 to vary from a value above E to E. Since this causes the plate of diode 48 to be above cathode voltage E during this half cycle, the diode will conduct producing a voltage across resistor 53 as shown in the first half of waveform 54. The curvature is due to the non-linearity of the diode characteristic. (Tube 47 was cut off and the voltage across resistor 53 due to conduction of tube 48 helps keep it cut off.)

During the second half cycle, the voltage at grid 42 varies from the value of average grid bias to a value above average grid bias and the voltage across cathode resistor 43 will rise with it from a value E to a value above E. Diode 47 will conduct increasingly producing across resistor 53 the other half cycle of waveform 54.

Tube 48 is cut off during this half cycle, as its plate voltage is always lower than its cathode voltage. Since grid 50 goes from average bias to value below it, the voltage across resistor 44 goes from E to a value below E. The cathode of 48 is always at E or above, and hence tube 48 cannot conduct.

If bias source 46 is raised to a value greater than E, each diode will conduct a smaller portion of its conducting half cycle giving a voltage across resistor 53 as shown in waveform 55.

Hence we see that by changing the value of bias voltage 46, we can change the shape of the compensation pattern to be applied to vary the gain of the panoramic device.

By varying the potentiometer 53, the amount of compensation voltage can be varied.

If the scanning width control 13 is turned down so that frequency range swept is less the amount of compensation will be less, due to the smaller positive and negative excursion of the sweep voltage.

If the diode characteristic is not such as to properly shape the compensation bias voltage, shaping circuits 52 may be employed to shape the waveform as desired before applying it to amplifier 2.

The invention has the following features:

Bandpass compensation is attained by applying a bias voltage to vary the gain of the device in inverse ratio to the selectivity of the input circuits.

The shape of the bias voltage can be easily varied to compensate for different conditions of receiver selectivity.

The amplitude of the bias voltage can be varied to adjust for variation in selectivity requirements.

The minimum gain point (or center of compensation) can be varied to adjust for variation in center frequency.

The amount of compensation automatically changes as the width of the frequency band swept changes.

It will be understood that the specific embodiments described above are exemplary only, and that the scope of the invention will be determined with reference to the appended claims.

The invention described herein may be manufactured and used by or for the Government of the United States of America for governmental purposes without the payment of any royalty thereon or therefor.

What is claimed is:

1. In a frequency scanning device including an amplifier providing a selectively attenuated frequency band, an oscillator, means operative to vary the frequency of the oscillator periodically through a predetermined band of frequencies, means mixing the outputs of the amplifier and the oscillator, means attenuating the oscillator output according to a predetermined frequency selectivity curve, means obtaining the envelope of the attenuated output, and means applying the voltage envelope as a bias voltage to said amplifier.

2. In combination, an amplifier for a selectively attenuated frequency band, frequency sweep means including oscillator means operative to produce an output the frequency of which varies periodically through a predetermined band of frequencies and means mixing the amplifier output and the varying frequency output, a resonant circuit energized by the varying frequency output of said oscillator means for producing an output having a predetermined frequency selectivity characteristic, means detecting the output of said circuit and utilizing the resultant voltage to vary the gain of said amplifier in inverse ratio to the selectivity characteristic of said frequency band.

3. In combination, an amplifier for a selectively attenuated frequency band, frequency sweep means including oscillator means operative to produce an output the frequency of which varies periodically through a predetermined band of frequencies and means mixing the amplifier output and the varying frequency output to produce an intermediate frequency output, oscillographic means operable in synchronism with said frequency sweep means for producing an indication of said intermediate frequency output, a resonant circuit energized by the varying frequency output of said oscillator means for producing an output having a predetermined frequency selectivity characteristic, means detecting the output of said circuit and utilizing the resultant voltage to vary the gain of said amplifier in inverse ratio to the selectivity characteristic of said frequency band.

4. In combination with a mixer, an oscillator coupled to said mixer and an amplifier feeding a selectively attenuated frequency band to said mixer, the selectivity characteristic of said frequency amplifier being in the form of a hump, cyclic sweep means including a saw-tooth wave generator for varying the frequency of said oscillator periodically through a predetermined band of frequencies in synchronism with said cyclic sweep means, means shaping the saw-tooth wave output of said generator for producing a voltage waveform varying the gain in inverse ratio to the selectivity characteristics of said frequency band and means applying said voltage waveform to vary the gain of said amplifier.

5. In a device for scanning a selectively attenuated frequency band, the selectivity characteristics being in the form of a hump, means cyclically scanning the frequency band, means for varying the gain of the device to compensate for selectivity characteristics of said frequency band comprising means operable in synchronism with scanning of the band and producing a bias voltage varying in inverse ratio to said selectivity characteristics and means employing said voltage to vary the gain of said device.

6. In a device for scanning a selectively attenuated frequency band, the selectivity characteristics being in the form of a hump, means cyclically scanning the frequency band, means operable in synchronism with scanning of the band for producing a bias voltage fed to the device to vary the gain thereof, and means adjusting the waveform of the bias voltage to vary the gain of the device in inverse ratio to said selectivity characteristics of the frequency band.

7. In a device for scanning a selectively attenuated frequency band, the selectivity characteristic being in the form of a hump, means cyclically scanning the frequency band, a bandpass compensation system comprising means operable in synchronism with scanning of the band for producing a bias voltage fed to the device to vary the gain thereof, means adjusting the waveform of the bias voltage to vary the gain of the device in inverse ratio to said selectivity characteristic of the frequency band, and means operative to adjust the overall amplitude of the bias voltage.

8. In a device for scanning a selectively attenuated frequency band, the selectivity characteristic being in the form of a hump, means cyclically scanning the frequency band, a bandpass compensation system comprising means operable in synchronism with scanning of the band for producing a bias voltage fed to the device to vary the gain thereof in inverse ratio to said selectivity characteristic of the frequency band, and means operative to control the bias voltage responsively to variations in frequency range being scanned for varying the amount of compensation.

9. In a device for scanning a selectively attenuated frequency band, a bandpass compensation system comprising means operative in synchronism with scanning of the band to supply a bias voltage fed to the device to vary the gain thereof, means adjusting the waveform of the bias voltage to vary the gain of the device in inverse ratio to the selectivity characteristic of the frequency band, and means for shifting the waveform of the bias voltage to maintain the maximum amplitude of the bias voltage coincident with the center frequency of the frequency band.

10. In a frequency scanning device, an amplifier providing a selectively attenuated frequency band, the selectivity characteristic being in the form of a hump, a variable frequency oscillator for cyclically sweeping the frequency band, a saw-tooth generator for controlling the oscillator, means shaping the saw-tooth output of the generator to provide a voltage waveform varying the gain in inverse ratio to said selectivity characteristic of the frequency band, and means applying said voltage to bias the amplifier in synchronism with the cyclic sweeping of said variable frequency oscillator.

11. In combination, an amplifier for a selectively attenuated frequency band, the selectivity characteristic being in the form of a hump, means cyclically scanning the output of the amplifier, circuit means producing a control voltage having a waveform corresponding to said frequency selectivity characteristic of the frequency band, means utilizing the control voltage to vary the gain of the amplifier in inverse ratio to said selectivity characteristic of the frequency band and means establishing synchronous operation of the scanning means and the circuit means.

12. An amplitude stabilization system comprising the combination of a radio receiver circuit having a non-uniform radio frequency response curve over the band of frequencies to be received, a signal transmission path coupled to the output of said receiver circuit for relaying the signals therefrom, the transfer efficiency of said path being inversely proportional to the magnitude of a control voltage fed thereto, a resonant circuit fixedly tuned to a first frequency, a source of variable frequency voltage coupled to the input of said resonant circuit, means coupled to said voltage source for periodically varying said voltage source above and below said first frequency, and means coupled between the output of said resonant circuit and said transmission path for developing a control voltage whose magnitude is proportional to the amplitude of the alternating voltage variations developed in said resonant circuit by said source of variable frequency voltage and for coupling the control voltage to said path to control the transfer efficiency thereof.

13. An amplitude stabilization system comprising the combination of a radio receiver circuit having a radio frequency response curve which varies in the same direction on either side of a first given frequency, a first radio frequency amplifier coupled to the output of said receiver circuit whose gain is inversely proportional to the magnitude of a control voltage fed thereto, a resonant circuit fixedly tuned to a second frequency, a source of variable frequency voltage coupled to the input of said resonant circuit, means coupled to said voltage source for periodically varying the frequency of said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier.

14. An amplitude stabilization system comprising the combination of a radio receiver circuit having a radio frequency response curve which varies in the same direction on either side of a first given frequency, a first radio frequency amplifier coupled to the output of said receiver circuit whose gain is inversely proportional to the magnitude of a control voltage fed thereto, a resonant circuit fixedly tuned to a second frequency different from said first frequency, a source of variable frequency voltage coupled to the input of said resonant circuit, means coupled to said voltage source for periodically varying the frequency of said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency and for coupling the control voltage to said radio frequency amplifier, a second means coupled to said amplifier output and to said source of variable frequency voltage for heterodyning the frequencies thereof, a third means tuned to one of the heterodyne frequencies coupled to said second means.

15. An amplitude stabilization system comprising the combination of a radio receiver circuit having a radio frequency response curve which varies in the same direction on either side of a first given frequency, a first radio frequency amplifier coupled to the output of said receiver circuit whose gain is inversely proportional to the magnitude of a control voltage fed thereto, a resonant circuit fixedly tuned to a second frequency, said resonant circuit including a variable resistance means, means for varying said resistance means whereby to vary the sharpness of the selectivity curve of said resonant circuit, a source of variable frequency voltage coupled to the input of said resonant circuit, means coupled to said voltage source for periodically varying the frequency of said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier.

16. An amplitude stabilization system comprising the combination of a radio receiver circuit having a radio frequency response curve which varies in the same direction on either side of a first given frequency, a first radio frequency amplifier coupled to the output of said receiver circuit whose gain is inversely proportional to the magnitude of a control voltage fed thereto, a resonant circuit fixedly tuned to a second frequency, a source of variable frequency voltage coupled to the input of said resonant circuit, means coupled to said voltage source for periodically varying said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier, a second means coupled to said amplifier output and to a source of periodically varying frequency voltage for heterodyning the frequencies thereof, a third means tuned to one of the heterodyne frequencies coupled to said second means.

17. In combination, a receiver having an input circuit, said input circuit having unequal sensitivity to different signals in a frequency band, a gain adjustable frequency scanning spectrum analyzer for analyzing and visually displaying the amplitudes of signals received by said input circuit, and means for varying the gain of said spectrum analyzer in synchronism with said frequency scanning during said frequency scanning so as to compensate for said unequal sensitivity of said input circuit to different frequencies in said frequency band.

18. In a device for scanning a selectively attenuated frequency band, a band pass compensation system comprising means operative in synchronism with scanning of the band to supply a bias voltage fed to the device to vary the gain thereof, means adjusting the waveform of the bias voltage to vary the gain of the device in inverse ratio to the selectivity characteristic of the frequency band, and means for shifting the waveform of the bias voltage to maintain the maximum amplitude of the bias voltage coincident with the center frequency of the frequency band.

19. In combination, a source of a selectively attenuated band of signals having unequal attenuation at different frequency positions of said band, a gain adjustable frequency scanning spectrum analyzer for analyzing and visually displaying the amplitudes of signals in said band, and means for varying the gain of said spectrum analyzer in synchronism with said frequency scanning during said frequency scanning so as to compensate for said unequal attenuation of different frequency positions of said band.

ELVIN E. HERMAN.

References Cited in the file of this patent

UNITED STATES PATENTS

| Number | Name | Date |
|---|---|---|
| 1,935,401 | Kenney | Nov. 14, 1933 |
| 2,245,365 | Riddle | June 10, 1941 |
| 2,323,376 | Harvey | July 6, 1943 |
| 2,371,397 | Koch | Mar. 13, 1945 |
| 2,412,991 | Labin | Dec. 24, 1946 |